United States Patent
Odinak

(10) Patent No.: US 8,335,544 B2
(45) Date of Patent: *Dec. 18, 2012

(54) SHARING ACCOUNT INFORMATION AND A PHONE NUMBER BETWEEN PERSONAL MOBILE PHONE AND AN IN-VEHICLE EMBEDDED PHONE

(76) Inventor: Gilad Odinak, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,407

(22) Filed: Feb. 14, 2011

(65) Prior Publication Data

US 2012/0135708 A1 May 31, 2012

Related U.S. Application Data

(63) Continuation of application No. 10/765,720, filed on Jan. 26, 2004, now Pat. No. 7,912,512, which is a continuation of application No. 10/076,027, filed on Feb. 12, 2002, now Pat. No. 6,748,244.

(51) Int. Cl.
*H04M 1/00* (2006.01)

(52) U.S. Cl. .............. 455/569.1; 455/41.2; 455/41.3; 455/99; 455/418; 455/420; 713/168; 713/170

(58) Field of Classification Search .............. 455/569.2, 455/569.1, 410, 411, 41.2, 41.3, 99, 418, 455/420, 435.1, 556.1, 557, 558; 713/168, 713/170

See application file for complete search history.

(56) References Cited

U.S. PATENT DOCUMENTS

| | | | |
|---|---|---|---|
| 4,876,710 A | 10/1989 | Reed et al. | |
| 5,029,233 A | 7/1991 | Metroka | |
| 5,062,132 A | 10/1991 | Yasuda et al. | |
| 5,259,018 A | 11/1993 | Grimmett et al. | |
| 6,052,604 A | 4/2000 | Bishop, Jr. et al. | |
| 6,405,027 B1 | 6/2002 | Bell | |
| 6,441,790 B1 | 8/2002 | Forrester et al. | |
| 6,487,402 B1 | 11/2002 | Faus et al. | |
| 6,748,244 B2 * | 6/2004 | Odinak | 455/569.2 |
| 6,748,246 B1 * | 6/2004 | Khullar | 455/574 |
| 2002/0028655 A1 | 3/2002 | Rosener et al. | |
| 2002/0068543 A1 | 6/2002 | Shah | |
| 2002/0142803 A1 | 10/2002 | Yamamoto | |
| 2002/0173347 A1 | 11/2002 | Kinnunen | |

* cited by examiner

*Primary Examiner* — Kamran Afshar
*Assistant Examiner* — Sayed T Zewari
(74) *Attorney, Agent, or Firm* — Foster Pepper PLLC; Richard T. Black; P. G. Scott Born

(57) ABSTRACT

A phone embedded within a vehicle for automatically using a service plan of a proximate personal mobile phone. The embedded phone includes an internal communication component that detects the presence of the personal mobile phone, and receives a mobile subscriber identification number from the detected phone. The embedded phone also includes an external communication component that sends the received mobile subscriber identification number to a wireless network authority, and receives an authentication request to the personal mobile phone via the embedded phone. The internal communication component sends the authentication request to the personal mobile phone. The personal mobile phone generates an authentication signal, and the external communication component sends the authentication signal to the wireless network authority.

4 Claims, 2 Drawing Sheets

SHARING ACCOUNT INFORMATION AND A PHONE NUMBER BETWEEN PERSONAL MOBILE PHONE AND AN IN-VEHICLE EMBEDDED PHONE

PRIORITY CLAIM

This application is a Continuation of and claims priority to U.S. patent application Ser. No. 10/765,720 filed Jan. 26, 2004, which is a continuation of U.S. application Ser. No. 10/076,027 filed on Feb. 12, 2002, which claims priority from U.S. Provisional Application Ser. No. 60/332,025, filed Nov. 21, 2001, which are incorporated by reference in their entireties.

FIELD OF THE INVENTION

This invention relates generally to telecommunications and, more specifically, to wireless telecommunications.

BACKGROUND OF THE INVENTION

Worldwide, regulatory bodies have begun to mandate the use of hands free systems for phone conversations in vehicles. A hands free system enables the driver to carry on a phone conversation without holding a phone to their ear. While some systems incorporate a headset, typically a hands free system comprises a microphone and speaker mounted in the vehicle and connected to a cellular phone mounted in a cradle. Existing systems typically require pressing keys on the phone or on a separate keypad embedded in the dashboard to dial a phone number. Newer systems use voice recognition, implemented as part of the hands free system or embedded phone system, to enable a true hands free operation. Some providers of applications attempt to use hands free systems (a.k.a. hands free kits) in tandem with the user's personal phone to deliver their service, removing the need for an in-vehicle embedded phone.

There exist disadvantages with current systems. A system based on a portable phone mounted in a cradle is inherently unreliable as the phone may become detached from its cradle at the time it is most needed (e.g., because of crash impact.) In addition, the driver may have forgotten their phone outside of the vehicle and only discover that when the phone is needed.

Bluetooth (BT) is a short-range wireless technology originally designed to replace patch cable between personal computers and related peripherals. This technology is making its way into mobile cellular phones to enable them to communicate over short range with other devices. BT applications may be connected to a personal phone in an in-vehicle hands free system. In one scenario, the driver gets into their vehicle and starts driving without pulling their phone out of their pocket. A BT transceiver that is part of the in-vehicle hands free system and the BT transceiver in the phone discover each other and establish a continuous wireless link. The hands free system now uses the driver's personal phone to connect with the cellular network.

The above solution suffers from limitations similar to the cradle solution and more severe. For example, wireless connections are inherently unreliable. On occasions the two systems do not establish a connection when the driver enters the car. Unlike when placing a phone into a cradle, there is no physical, tangible cue to the driver to indicate a likely connection failure. Even after the initial connection has been established, it may be dropped at any time; even in the middle of a conversation. In addition, the phone may be placed at a location in the vehicle with poor cellular reception (e.g. below glass window level) that does not have access to a vehicle mounted external antenna. Lastly, in dense traffic and given BT security issues, conversation privacy may be compromised as it may leak over the BT network to other vehicles in close proximity.

Therefore, there exists a need to provide a more reliable, less costly, hands free vehicle phone system.

SUMMARY OF THE INVENTION

The present invention is a phone embedded within a vehicle for automatically using a service plan of a personal mobile phone. The embedded phone includes an internal communication component that detects the presence of the personal mobile phone, and receives a mobile subscriber identification number from the detected phone. The embedded phone also includes an external communication component that sends the received mobile subscriber identification number to a wireless network authority, and receives an authentication request to the personal mobile phone via the embedded phone. The internal communication component sends the authentication request to the personal mobile phone. The personal mobile phone generates an authentication signal, and the external communication component sends the authentication signal to the wireless network authority.

In accordance with further aspects of the invention, the internal communication component performs interaction with the personal mobile phone based on a Bluetooth link, an infrared wireless (IR) link, an 802.11 wireless network link, or a physical electrical wire link.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention is a system and method for enabling an in-vehicle embedded phone to use the account, calling plan and phone number of a personal mobile phone. A vehicle 20 is equipped with a Telematics Control Unit (TCU) 30 and an embedded vehicle phone 40. Embedded vehicle phone 40 may be independent from or integral with TCU 30. TCU 30 includes a wireless communication module 32 capable of short range wireless communication with other compatible devices, such as a personal mobile phone 50. TCU 30 includes hands-free components (not shown) directly linked to embedded phone 40. Hands-free components can also be included in embedded vehicle phone 40. The hands-free components may include a microphone, speakers, and speech recognition and synthesizing software. TCU 30 retrieves information from compatible mobile wireless phone 50 for allowing embedded phone 40 to provide access to the wireless communication network using the retrieved information.

Figure 1:
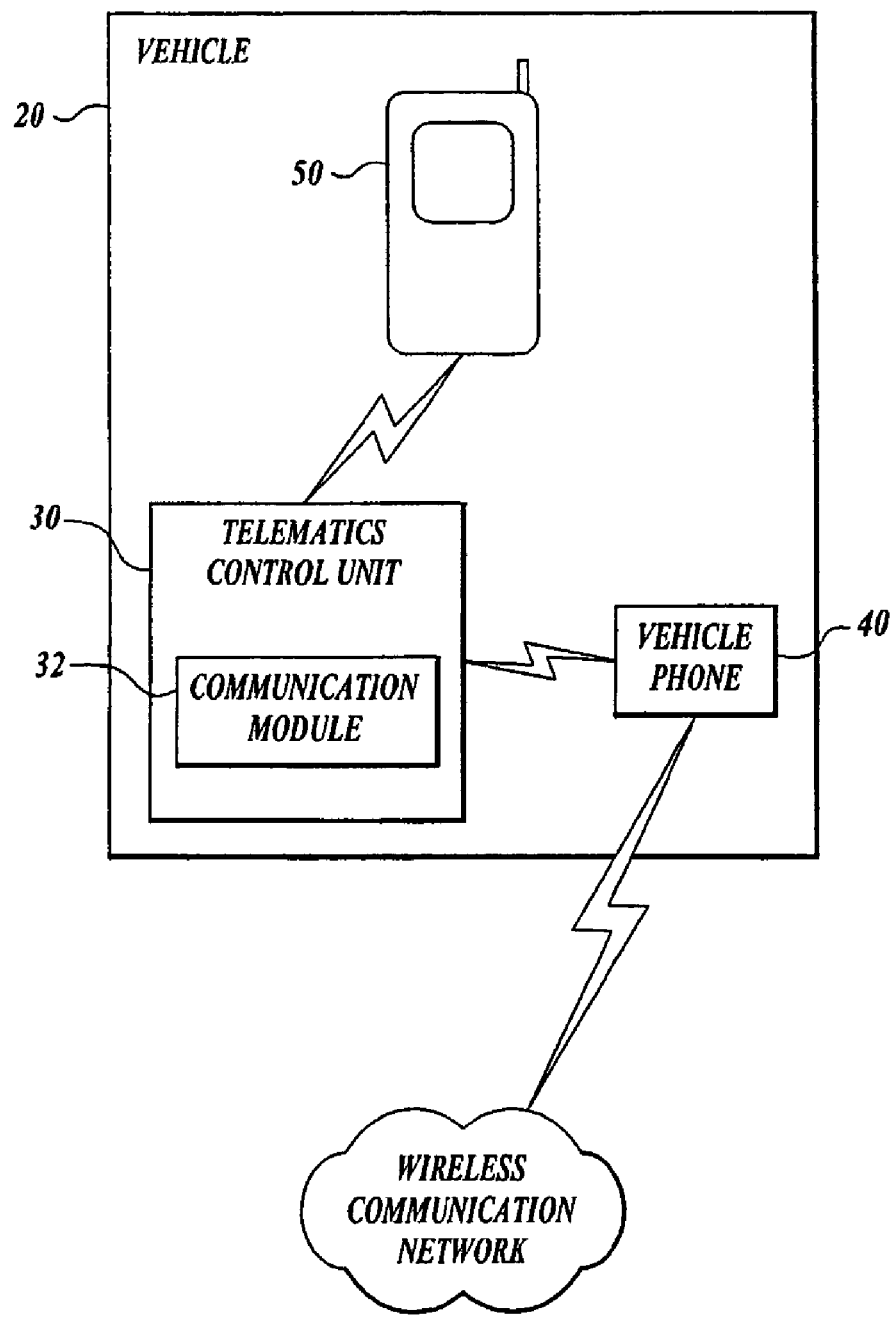
FIG. 1 is a block diagram of an example of the present invention.
Figure 2:
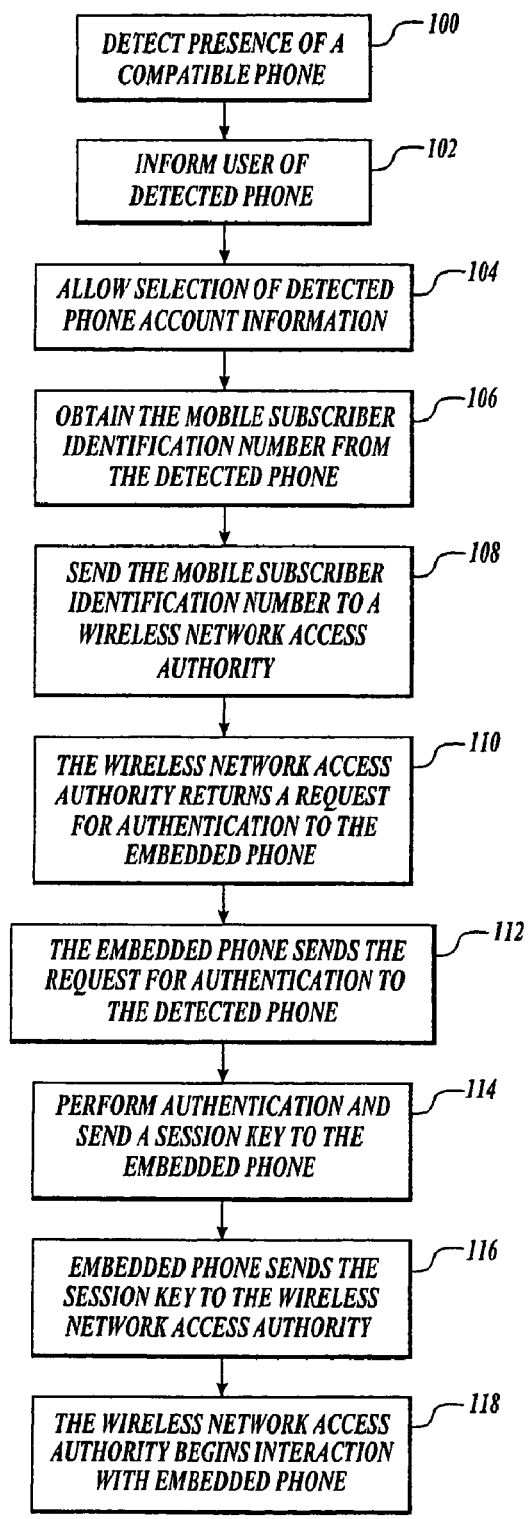
FIG. 2 is a flow diagram illustrating a preferred process performed by the system shown in FIG. 1.

FIG. 2 illustrates an embodiment of the present invention. First, at block 100, communication module 32 detects the presence of a compatible phone, such as personal mobile phone 50. Detection can be performed a number of ways, for example, personal mobile phone 50 transmits a short range identification signal or communication module 32 transmits a short range signal that requests a response from any compatible phone within a proximity. When a compatible personal mobile phone 50 is detected, the user (a driver or passenger in the vehicle) is informed about the detected phone (block 102). At block 104, TCU 30 asks the driver if they wish to use the service associated with the detected phone in embedded vehicle phone 40. Asking the driver can be performed by presenting a query on a display or outputting a voice query over a speaker. If the driver approves of using the detected phone's account information, mobile subscriber identification number from the detected phone is sent to vehicle phone 40 via the communication module 32 (block 106). At block 108, embedded vehicle phone 40 sends the mobile subscriber identification number to a wireless network access authority. At block 110, the wireless network access authority returns a request for authentication to the embedded vehicle phone. Embedded vehicle phone 40 sends the request for authentication to the detected phone (block 112). The detected phone performs authentication in response to the request and sends an authentication response to embedded vehicle phone 40 (block 114). At block 116, the embedded vehicle phone sends the session key to the wireless network access authority. After the wireless network access authority receives the session key, the access authority opens a session with embedded vehicle phone 40 (block 118).

Once a session is opened or interaction is begun with embedded vehicle phone 40, the embedded vehicle phone operates as if it were the detected phone. Because embedded vehicle phone 40 includes hands-free components within vehicle 20, or is coupled to hands-free components of TCU 30, the driver vocalizes all instructions for operating the embedded phone. The hands-free components may include a voice recognition processor for converting voice into operating commands.

Once the link is established, the vehicle user bypasses the personal phone and directly uses the vehicle phone—albeit with the account information from the personal phone. In alternative embodiments, the account link between personal mobile phone 50 and embedded vehicle phone 40 may be terminated based on certain trigger events associated with the vehicle or driver, such as when the engine is turned off or the vehicle is locked. Triggers may also include safety related events, such as sudden stops or reaching excessive speeds.

In an alternative embodiment, personal mobile phone 50 may electrically connect to TCU 30, either mounted in a cradle or connected via a short cable. TCU 30 detects the personal mobile phone's presence when the phone is placed into the cradle or connected via a cable. In another embodiment, personal mobile phone 50 communicates with TCU 30 over an Infrared wireless (IR) link, or an 802.11 Wireless LAN to establish communication between TCU 30 and personal mobile phone 50.

From time to time the network may request re-authentication. TCU 30 forwards all requests in the above-described manner to personal mobile phone 50. If that operation fails, TCU 30 optionally notifies the driver and then reverts to using its own account. In the absence of such an account, TCU 30 notifies the driver of its inability to make the call, save for emergency calls (e.g., in the United States, 911 calls and all other phone numbers defined as 'emergency numbers'), which may be made even in the absence of a TCU account.

While the preferred embodiment of the invention has been illustrated and described, as noted above, many changes can be made without departing from the spirit and scope of the invention. For example, various alternate embodiments of the present invention may be implemented using a variety of telecommunication protocols, such as GSM, TDMA, CDMA, iDEN, etc. Accordingly, the scope of the invention is not limited by the disclosure of the preferred embodiment.

The embodiments of the invention in which an exclusive property or privilege is claimed are defined as follows:

1. A method for automatically using a service plan of a personal mobile phone over a phone embedded within a vehicle, the method comprising:
   detecting the presence of the personal mobile phone;
   sending the mobile subscriber identification number from the detected phone to the embedded phone;
   sending the mobile subscriber identification number from the embedded phone to a wireless network authority;
   sending an authentication request to the personal mobile phone via the embedded phone;
   authenticating communication;
   sending a confirmation of the authentication to the wireless network authority via the embedded phone; and
   opening a communication session with the embedded phone based on the sent confirmation.

2. The method of claim 1, wherein detecting the presence of the personal mobile phone is performed based on at least one of a Bluetooth link, an infrared wireless (IR) link, an 802.11 wireless network link, or a physical electrical wire link.

3. A phone embedded within a vehicle for automatically using a service plan of a personal mobile phone, the embedded phone comprising:
   an internal communication component for detecting the presence of the personal mobile phone, and receiving a mobile subscriber identification number from the detected phone; and
   an external communication component for sending the received mobile subscriber identification number to a wireless network authority, and receiving an authentication request to the personal mobile phone via the embedded phone, wherein the internal communication component sends the authentication request to the personal mobile phone that generates an authentication signal, the external communication component sends the authentication signal to the wireless network authority.

4. The embedded phone of claim 1, wherein the internal communication component performs interaction with the personal mobile phone based on at least one of a Bluetooth link, an infrared wireless (IR) link, an 802.11 wireless network link, or a physical electrical wire link.

* * * * *